TRANSISTOR MOUNTING

Filed Nov. 30, 1959

INVENTORS
MEADE M. HOWER
WILLIAM B. VOORHIS
BY
Eyre, Mann & Lucas
ATTORNEYS

United States Patent Office 3,041,510
Patented June 26, 1962

3,041,510
TRANSISTOR MOUNTING

Meade M. Hower, Fanwood, and William B. Voorhis, Livingston, N.J., assignors to Tung-Sol Electric Inc., a corporation of Delaware Filed Nov. 30, 1959, Ser. No. 856,107
6 Claims. (Cl. 317—235)

This invention relates to a mounting for a transistor and has particular reference to a structure which secures a transistor within a mounting compartment and in addition provides a sink for removal of generated heat without making an electrical connection to the metal case.

It is well-known that the junction temperature is the characteristic which limits the performance of the device. This is especially true for the smaller devices where the transistor electrodes and supporting structures are too small to effectively carry away the generated heat. For this reason several techniques have been used in order to create a good thermal path from the junction to the outside case. One of the most successful of these designs includes a metallic connection between one of the electrodes and the outside metal case. This connection, however, has the disadvantage of limiting the response in high frequency applications.

The present invention uses a flat metal conductor for conducting the heat away from the base electrode. This conductor is connected to a portion of the mounting electrode and is bonded to a portion of the mounting shell by means of a thin non-conductive plastic film. This film is of the order of .005 of an inch in thickness. It provides electrical insulation between the two metal surfaces while conducting sufficient heat from the transistor to the mounting shell to maintain the transistor at a temperature which is within the working range of the transistor components.

One of the objects of this invention is to provide a transistor mounting structure which avoids one or more of the disadvantages and limitations of prior art structures.

Another object of the invention is to increase the flow of generated heat from the transistor electrodes to the outside case and maintain electrical isolation.

Another object of the invention is to provide a sturdy mechanical structure for the transistor which improves the overall strength of the unit.

The invention includes the usual header being a metal shell filled with insulating material which supports the lead-in conductors for making electrical contact with the transistor electrodes. The metal mounting shell is formed with a turned-up portion for the collection and conduction of heat from the transistor unit. The transistor is mounted with its base electrode secured to a flat metal conductor and this conductor is connected at one side with one of the lead-in conductors. The other side of the flat conductor is bonded to the turned-up portion of the shell by means of a thin non-conductive plastic film which provides heat conductivity but electrical insulation.

For a better understanding of the present invention, together with other and further objects thereof, reference is made to the following description taken in connection with the accompanying drawings.

Figure 1:
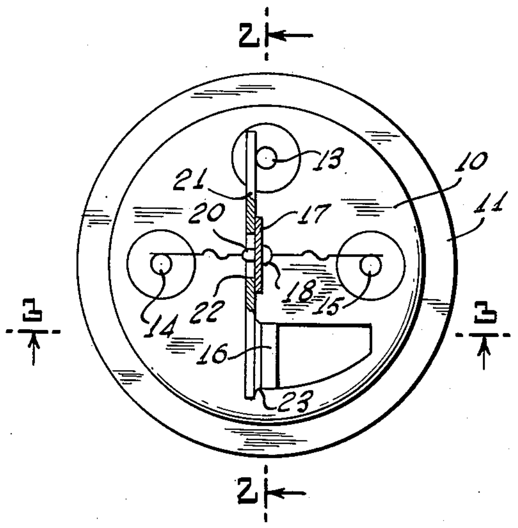
FIG. 1 is a top view of the mounting shell with the cover removed.
Figure 2:
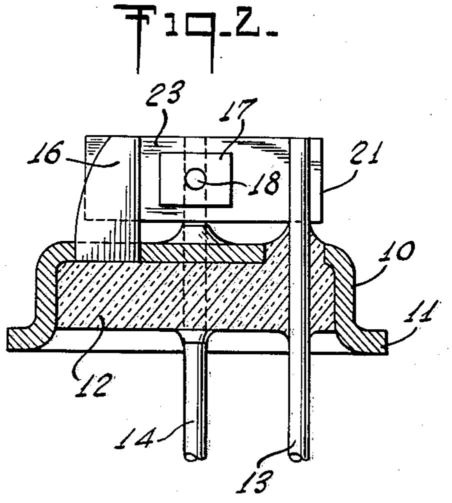
FIG. 2 is a cross sectional view of the mounting shown in FIG. 1 and is taken along line 2—2 of that figure.
Figure 3:
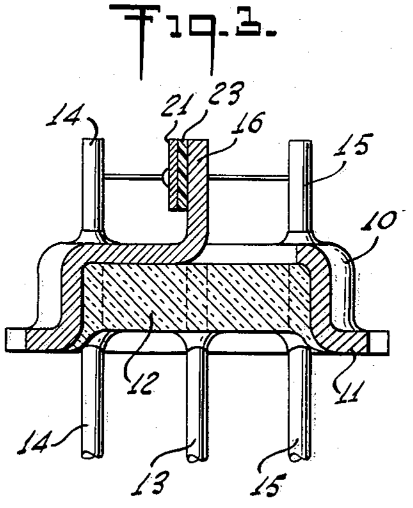
FIG. 3 is another cross sectional view of the mounting shown in FIG. 1 and is taken along line 3—3 of that figure.

Referring now to the drawing, the transistor mounting includes the usual metal shell 10 with a flanged base portion 11 and insulating material 12. The insulating material 12 supports three lead-in conductors 13, 14, and 15, these conductors being secured to the transistor electrodes and providing conductive means for connection to an external circuit.

The shell 10 is constructed with a flat top portion having three holes for the passage of the lead-in conductors and in this instance a portion 16 of the top piece is bent up to provide a heat conductive member.

The transistor includes a flat base electrode 17 which may be made of germanium. On one side of this electrode a small indium dot 18 is mounted, this dot is the collector. On the other side of base 17 another indium dot 20 which is the emitter is placed similar to dot 18. Electrodes 18 and 20 are joined respectively to lead-in conductors 14 and 15 by small resilient wire connectors.

The base 17 is joined to a flat metal conductor 21 which may be made of nickel. A small hole 22 is cut in the middle portion of the flat conductor to define the active base area. The flat metal piece 21 is soldered or welded to lead-in conductor 13 for connection to an external circuit, and the other end of the metal conductor is bonded to the turned-up portion 16 by means of a thin plastic insulating film 23 which may be as thin as .002 of an inch.

It has been found that a thin film of epoxy cement interposed between the turned-up portion 16 and the flat conductor 21 provides a secure bond to hold the two together and, in addition, insulates the two electrically. However, the film is so thin and covers such an extended area that the heat generated in the transistor components flows across the film into the turned-up portion 16 and to the rest of the shell 10 and to the outer case (not shown) to which the flange 11 is secured.

Many other materials may be employed in place of the epoxy cement. It has been found that finely divided aluminum oxide particles when added to the bonding material improve the heat flow.

The foregoing disclosure and drawings are merely illustrative of the principles of this invention and are not to be interpreted in a limiting sense. The only limitations are to be determined from the scope of the appended claims.

We claim:

1. A transistor mounting comprising: a base support for the transistor including a metal shell filled with insulating material which supports a plurality of lead-in conductors for connection to an external circuit; a transistor having at least a base, a collector, and an emitter; said metal shell having an integral turned-up portion for conduction of heat; a flat metal conductor which supports one of said transistor electrodes, said flat conductor electrically connected to one of said lead-in conductors; and a thin non-conductive film which provides a bond between an area of the flat conductor and said turned-up portion.

2. A transistor mounting as claimed in claim 1 wherein the base electrode of the transistor is joined to the flat metal conductor.

3. A transistor mounting as claimed in claim 1 wherein said bond extends for at least 10 percent of the area of the flat metal conductor.

4. A transistor mounting as claimed in claim 1 wherein said bonding material is an epoxy cement.

5. A transistor mounting as claimed in claim 1 wherein said bonding material includes aluminum oxide.

6. A transistor mounting comprising; a base support for the transistor including a metal shell filled with insulating material which supports three lead-in conductors for connection to an external circuit; a transistor having a base, a collector, and an emitter; a flat conductor which supports one of said transistor electrodes, said flat conductor electrically connected to one of said lead-in conductors, and a thin non-conductive film which provides a bond between said flat conductor and a portion of said metal shell.

References Cited in the file of this patent

UNITED STATES PATENTS

| | | |
|---|---|---|
| 2,748,235 | Wallace | May 29, 1956 |
| 2,914,716 | Larrison | Nov. 24, 1959 |